United States Patent
Wolber

Patent Number: 5,377,318
Date of Patent: Dec. 27, 1994

[54] LINE PROBE DIAGNOSTIC DISPLAY IN AN ICONIC PROGRAMMING SYSTEM

[75] Inventor: Susan G. Wolber, Fort Collins, Colo.

[73] Assignee: Hewlett-Packard Company, Palo Alto, Calif.

[21] Appl. No.: 149,154

[22] Filed: Nov. 8, 1993

Related U.S. Application Data

[63] Continuation of Ser. No. 661,936, Feb. 28, 1991, abandoned.

[51] Int. Cl.$^5$ .............................................. G06F 15/62
[52] U.S. Cl. .................................... 395/159; 395/157; 395/161
[58] Field of Search ................................ 395/155–161, 395/140, 700; 364/488–492, 578

[56] References Cited

U.S. PATENT DOCUMENTS

| | | | |
|---|---|---|---|
| 4,315,315 | 2/1982 | Kossiahoff | 395/140 |
| 4,455,619 | 6/1984 | Masui et al. | 345/160 |
| 4,546,435 | 10/1985 | Herbert et al. | 395/700 |
| 4,812,996 | 3/1989 | Stubbs | 395/156 X |
| 4,813,013 | 3/1989 | Dunn | 395/159 |
| 4,901,221 | 2/1990 | Kodosky et al. | 364/200 |
| 4,914,568 | 4/1990 | Kodosky et al. | 364/200 |
| 4,956,773 | 9/1990 | Saito et al. | 395/159 |
| 4,984,152 | 1/1991 | Muller | 395/159 X |
| 5,040,131 | 8/1991 | Torres | 395/156 |

OTHER PUBLICATIONS

Borg, "Visual Programming and VNIX", IEEE, 1989, pp. 74–79.
Myers et al, "Automatic Data Visualization for Novice Pascal Programmers", IEEE, 1988, pp. 192–198.
Roberts et al, "The Design View", IEEE, 1988, pp. 213–220.
Shimomura et al., "VIPS", IEEE, 1990, pp. 530–537.
Strassberg, "Icon-Based Instrument-Control Software Works with PC Bus Data–Acquisition Boards", Jan. 1990, EDN, p. 81.
Chang, "Visual Languages: A Tutorial and Survey", IEEE Software, Jan. 1987, pp. 29–39.
Edel, "The Tinkertoy Graphical Programming Environment", Compsac '86, Oct. 1986, pp. 1110–1115.
Mosley, "LabView Upgrade Reduces Execution Time and Enhances Editing and Graphics Controls", EDN, Sep. 15, 1988, p. 134.
*Programming With Pictures,* Jeff Kodosky and Bob Dye, Computer Language Magazine, Jan. 1989, pp. 61–69.
Labview Product Description, National Instruments Corp., Austin, Texas, 1987.
*An Instrument That Isn't Really,* Michael Santori, IEEE Spectrum, Aug. 1990, pp. 36–39.
*Labview: Laboratory Virtual Instrument Engineering Workbench,* G. Vose and G. Williams, BYTE Magazine, Sep. 1986, pp. 84–92.

Primary Examiner—Mark R. Powell
Assistant Examiner—John E. Breene

[57] ABSTRACT

A line probe function within an iconic programming system. During execution of the iconic program, the user of the system can use mouse or keyboard input to select the line probe function. When selected, the line probe stops the processing of the iconic system and displays a message asking the user to select a connecting line, an icon input terminal, or an icon output terminal. When the user selects one of these, the line probe obtains information from the object about data the object contains. The line probe then creates a dialog box on the windowing system used by the iconic programming system, displays the information along with a pushbutton, and waits for user input. The user may input data to modify the information displayed, and when the user clicks on the pushbutton, the line probe erases the dialog box and continues processing the iconic program.

12 Claims, 7 Drawing Sheets

LINE PROBE DIAGNOSTIC DISPLAY IN AN ICONIC PROGRAMMING SYSTEM

This is a continuation of copending application Ser. No. 07/661,936 filed on Feb. 28, 1991, now abandoned.

CROSS REFERENCE TO RELATED APPLICATIONS

This application is related to application Ser. No. 07/483,478 filed Feb. 22, 1990 for PROGRAMMING ESCAPE FROM AN ICONIC SYSTEM of Bailey, Beethe, Wolber, and Williams; and application Ser. No. 07/537,550 filed Jun. 13, 1990 for PROCESSING METHOD FOR AN ICONIC PROGRAMMING SYSTEM of Beethe; both assigned to the same entity.

FIELD OF THE INVENTION

This invention relates to computer systems and more particularly to Iconic Programming Systems. Even more particularly, the invention relates to examining data and contact lines in an iconic programming system.

BACKGROUND OF THE INVENTION

An iconic programming system is a "programming-less" environment where programming is done by connecting graphical images of devices (icons), together with connecting lines, to create an iconic network which represents a software program. The iconic programming system may be used in research and development test environments, where several different electronic instruments are connected to test a system or device. Programming such a system requires instructions to cause the various instruments to perform desired functions in order to operate as a system.

When an iconic programming system is used, each instrument will be represented by a graphical icon, also called a graphical object, and the connections between the instruments are represented by connecting lines between the graphical icon images. Each device may have multiple lines connecting from other devices, bringing data into the device for it to use during its execution. Each device may also have multiple output lines connecting to other devices, to pass its new or changed data on to the other devices in the program. In addition to graphical icons representing instruments in such a system, graphical icons are provided for programming functions, for example looping, IF-THEN statements, etc. By combining instrument and programming icons, a user can create an iconic network involving the programmed operation of several instruments. An example of a simple iconic network is shown in FIG. 2, described below.

When the program runs, each device executes in turn, and during its execution, each device may use the data on its input lines, modify it, and put the same or other data on its output lines for other devices to use.

One difficulty encountered in designing and creating an iconic network is the problem of debugging the network. Although some prior art systems show the type of data on a line connecting two icons, none provide a way of determining the value of the data that is sent on an output line and received by another icon. One method used in the prior art is to connect a display icon to a connecting line, however this requires anticipating which lines will encounter problems. For example, if a network has been running for a long time, and the user/programmer suddenly wants to see the data on a line which does not have a display icon connected to it, the network must be stopped, a display connected to the line, and the network restarted. This may take considerable time, and it will only work if the network performs in exactly the same manner when restarted. If the input data to the network is unpredictable, the network may not perform in the same way, and the user/programmer may have to examine a different line, which would require repeating this process.

There is a need in the art then for a system that will interactively probe an arbitrary line, so that the user can observe the data, if any, present on the line. There is further need for such a system that will display the data type, whether the data is scalar or array, the number of dimensions and dimensions sizes, if the data is an array, the data values, and any mappings on the data. There is a still further need for such a system that is capable of displaying control lines or error lines that may carry a boolean or error value. The present invention meets these needs.

Various features and components of an iconic network system are disclosed in U.S. patent applications:

(A) Application Ser. No. 07/483,478 filed Feb. 22, 1990 for PROGRAMMING ESCAPE FROM AN ICONIC SYSTEM of Bailey, Beethe, Wolber, and Williams;

(B) Application Ser. No. 07/537,550 filed Jun. 13, 1990 for PROCESSING METHOD FOR AN ICONIC PROGRAMMING SYSTEM of Beethe;

which are each hereby specifically incorporated by reference for all that is disclosed therein.

SUMMARY OF THE INVENTION

It is an aspect of the present invention to provide a system to interactively display data on an arbitrary connecting line or icon terminal within an iconic network.

It is another aspect of the invention to display the data type and shape as well as the data values.

Yet another aspect is to allow the user to change the data values.

Still another aspect is to display any mappings on the data.

A further aspect of the invention is to display data on control and error lines within the iconic network.

The above and other aspects of the invention are accomplished by a line probe function within an iconic programming system. During execution of the iconic program, the user of the system can use mouse or keyboard input to select the line probe function. When selected, the line probe stops the processing of the iconic system and displays a message asking the user to select a connecting line, an input terminal to an icon, or an output terminal of an icon. When the user selects one of these, the line probe queries the object selected to obtain information about data the object contains. The line probe then creates a dialog box on the windowing system used by the iconic programming system to display the information about the object. The line probe then displays the information, along with an "OK" pushbutton, and waits for the user to use the mouse to click on the OK pushbutton. When the user clicks on the pushbutton, the line probe erases the dialog box and continues processing the iconic program.

The line probe need not be configured in advance, but instead allows the user to dynamically select the object to be probed. Also, the user does not need to define the type of data to the line probe, but instead, when an object is selected, the line probe automatically determines the type and value of the data to be displayed.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
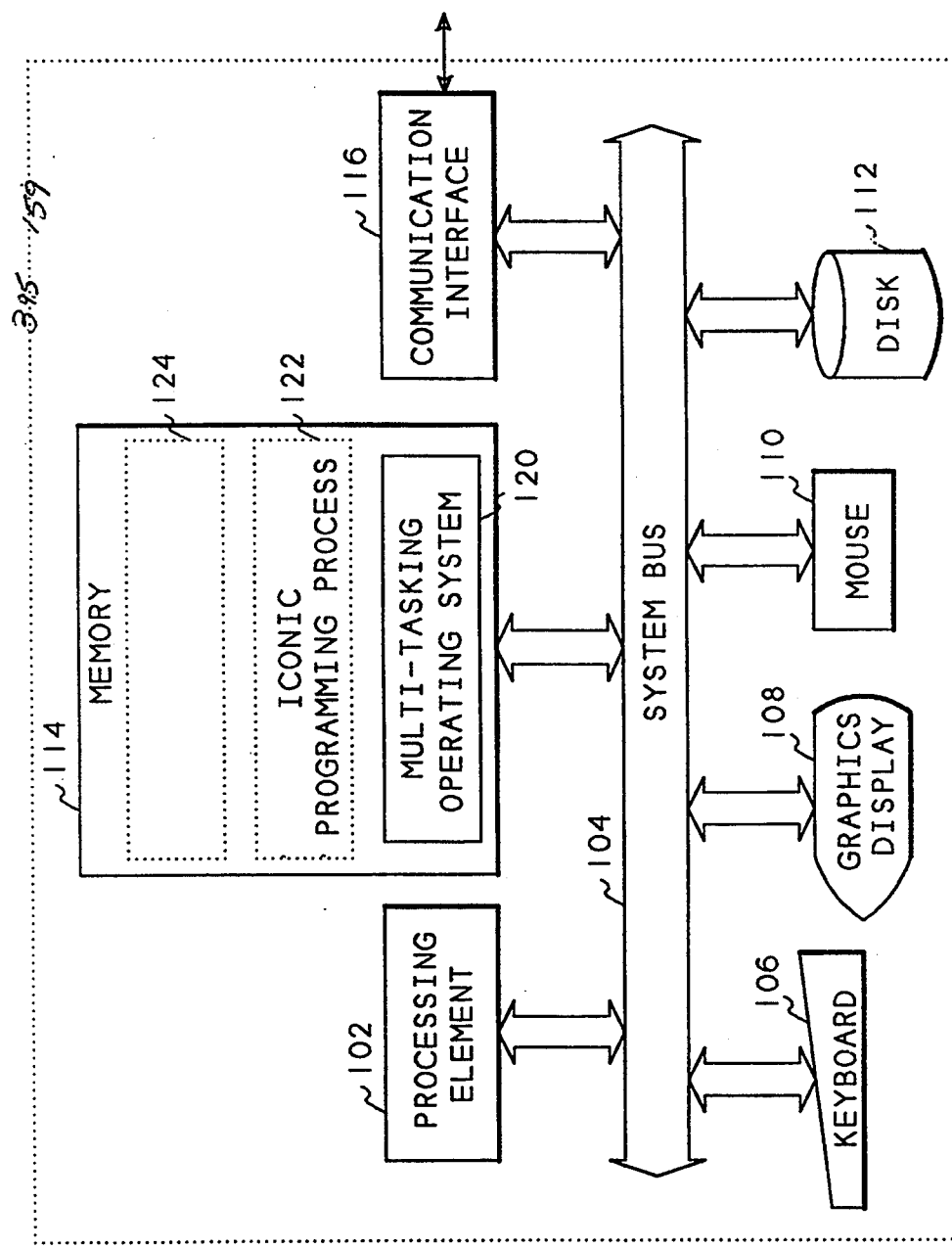
FIG. 1 shows a block diagram of a computer system incorporating the present invention.

FIG. 1 shows a block diagram of a computer system incorporating the present invention. Referring now to FIG. 1, a computer system 100 contains a processing element 102 which connects to the other components of the system through a system bus 104. A keyboard 106 allows a user to input textual data to the system, and a mouse 110 allows a user to input graphical data to the system. A graphics display 108 allows the system to output text and graphical information to the user. A disk 112 is used by the system to store the software of the iconic programming system environment, as well as the user-defined iconic network. A communications interface 116 is used to create a communications network which allows the computer and iconic programming environment to communicate with other computers and other environments. A multi-tasking operating system 120 can have a plurality of tasks, also called processes, here illustrated by task 122 and task 124. Task 122 is shown containing the iconic programming process including the line probe of the present invention.

Figure 2:
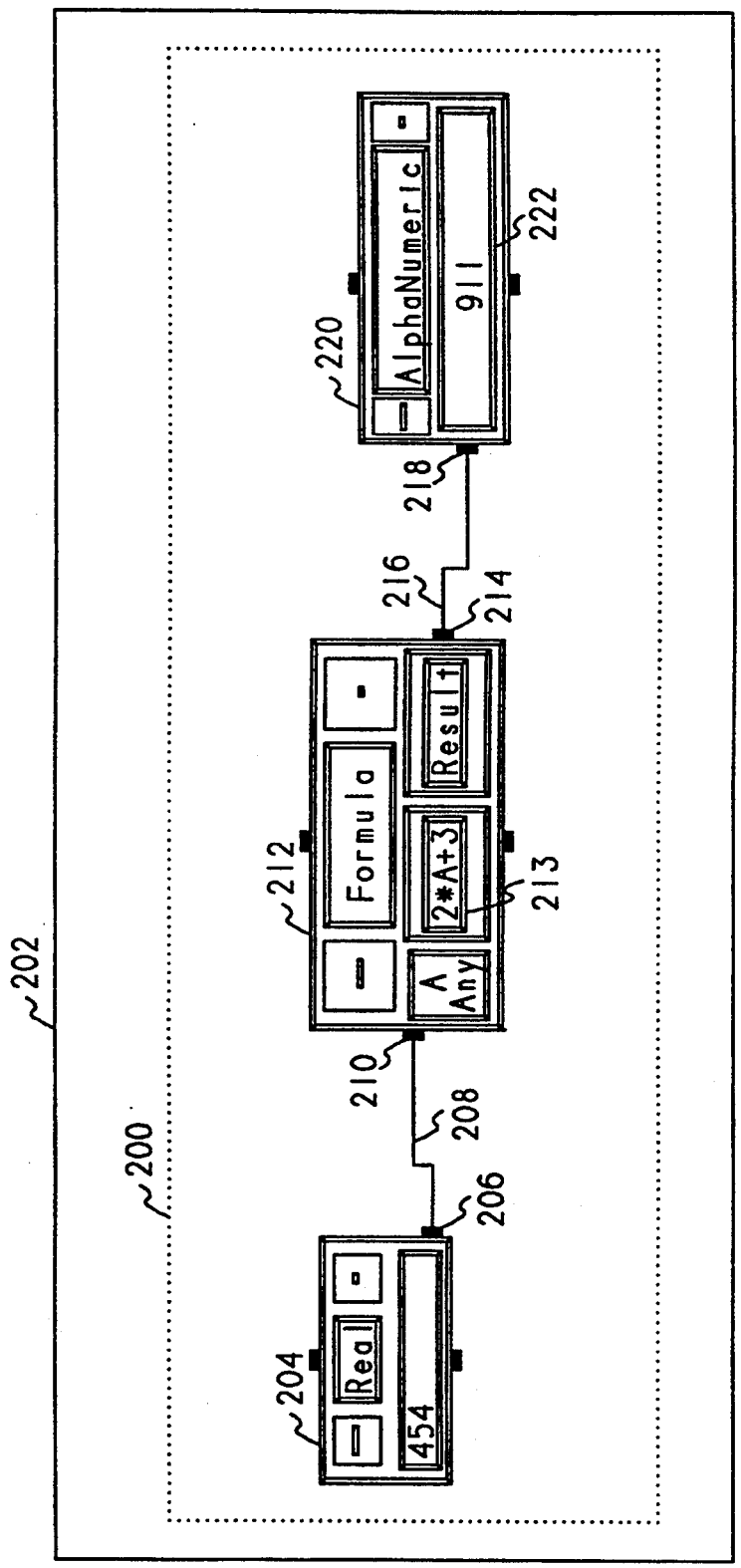
FIG. 2 shows a prior art iconic network suitable for use with the present invention.

FIG. 2 shows a simple prior art iconic network program that will be used to illustrate the line probe of the present invention. This simple iconic network is for illustration purposes only. The line probe of the present invention can be used with any iconic network, however complicated that network might be. Referring now to FIG. 2, an iconic network 200 is shown displayed on a graphical display 202. The graphical display 202 represents the output of the graphics display 108 (FIG. 1). The iconic network 200 contains an icon 204 which is used to input a real number into an iconic network program. In the example icon 204, the real number being input is the number 454. The real number is output by the icon 204 via an output terminal 206. The output terminal 206 is connected to an input terminal 210 of a formula icon 212. The connection between the output terminal 206 of icon 204 and the input terminal 210 of icon 212 is made with a connecting line 208.

The formula icon 212 will process data received on the input 210 using a formula shown in the box 213. In this example, the formula multiplies the input terminal by 2 and adds 3 to the result. This is by way of example only since any arbitrary formula, however complex, could be used in the formula icon 212. The number arrived at by applying the formula in the box 213 to the input data 210 is placed on the output 214, which is named the "result". The output 214 is connected by a connecting line 216 to an input terminal 218 of an alphanumeric display icon 220. The alphanumeric display icon 220 displays the input that it receives on input 218 in a box 222.

The line probe of the present invention can dynamically display the data on any of the input or output terminals of any of the icons, or any of the connecting lines. For example, the line probe could be used to display data on output terminal 206, line 208, input terminal 210, output terminal 214, line 216, or input terminal 218. As will be described below, the user of the system may choose any of these terminals or lines to display when the user activates the line probe.

Figure 3:
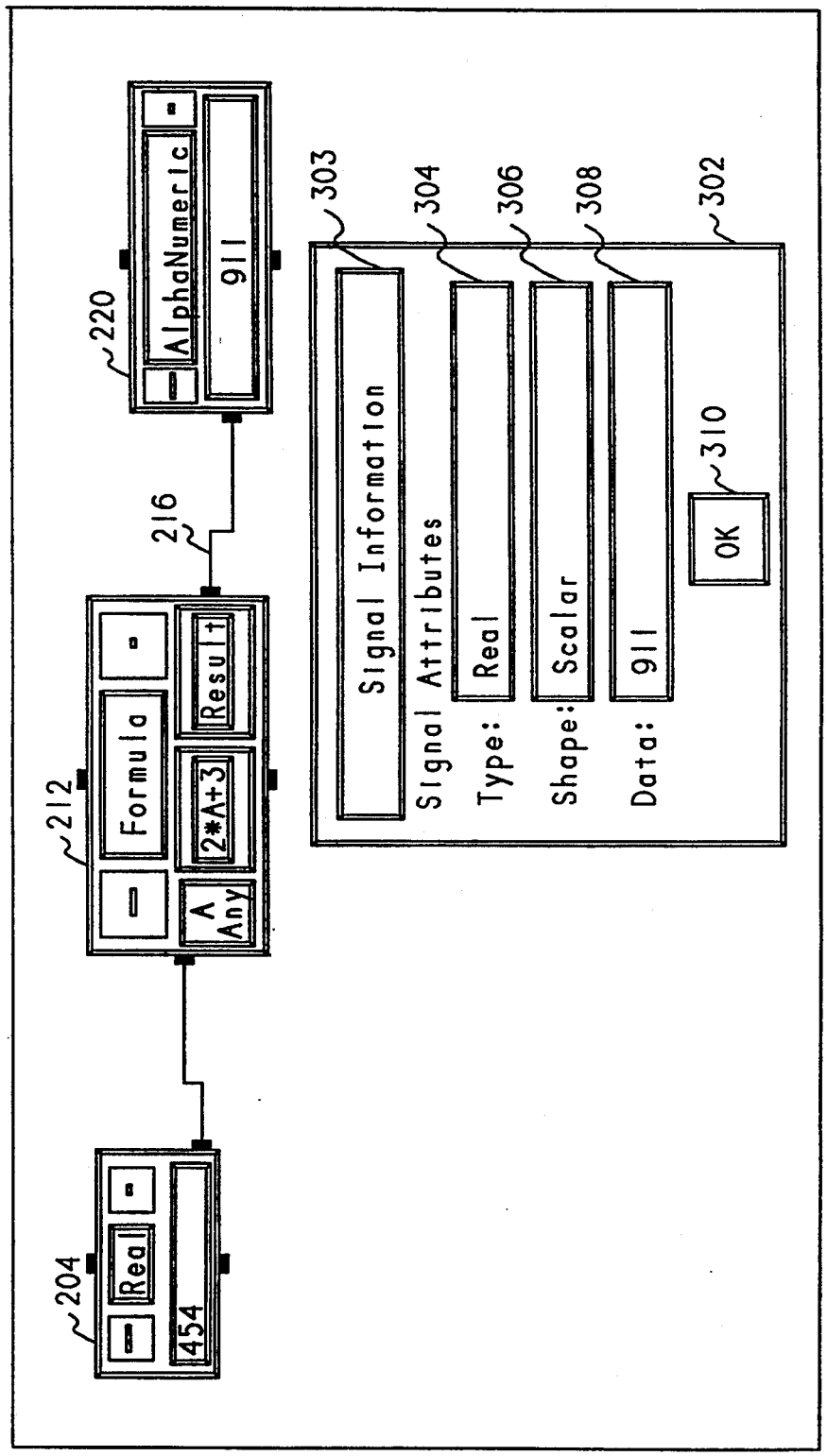
FIG. 3 shows a computer display illustrating the line probe display of a connecting line between two icons.

FIG. 3 shows the iconic network of FIG. 2 with the addition of the line probe display of the present invention. Referring now to FIG. 3, the iconic network of FIG. 2 including the real icon 204, formula icon 212, and alphanumeric icon 220 is shown. In FIG. 3, the user of the system has requested that the line probe of the present invention display data on the connecting line 216. This data is displayed in a new icon 302 which displays signal information for the connecting line 216. The icon 302, also called a dialog box, has a title 303 called signal information and shows three types of signal attributes. Box 304 displays the type of data that was present on the connecting line 206. In this case the data type is a real number. Box 306 shows the shape of the data present on the connecting line 216, in this case the shape is scalar, that is, the data is a single value as opposed to an array of information. Box 308 shows the value of the data, in this case the numeric value "911". The "OK" box 310, is used when the user of the system desires to stop the line probe. When the user wishes to stop the line probe and continue processing of the iconic network, they move the mouse to position the mouse sprite over the "OK" box 310 and press or "click" the mouse button. When the system detects the mouse click with the sprite located over the box 310, the system erases the dialog box 302 and discontinues the line probe.

Figure 4:
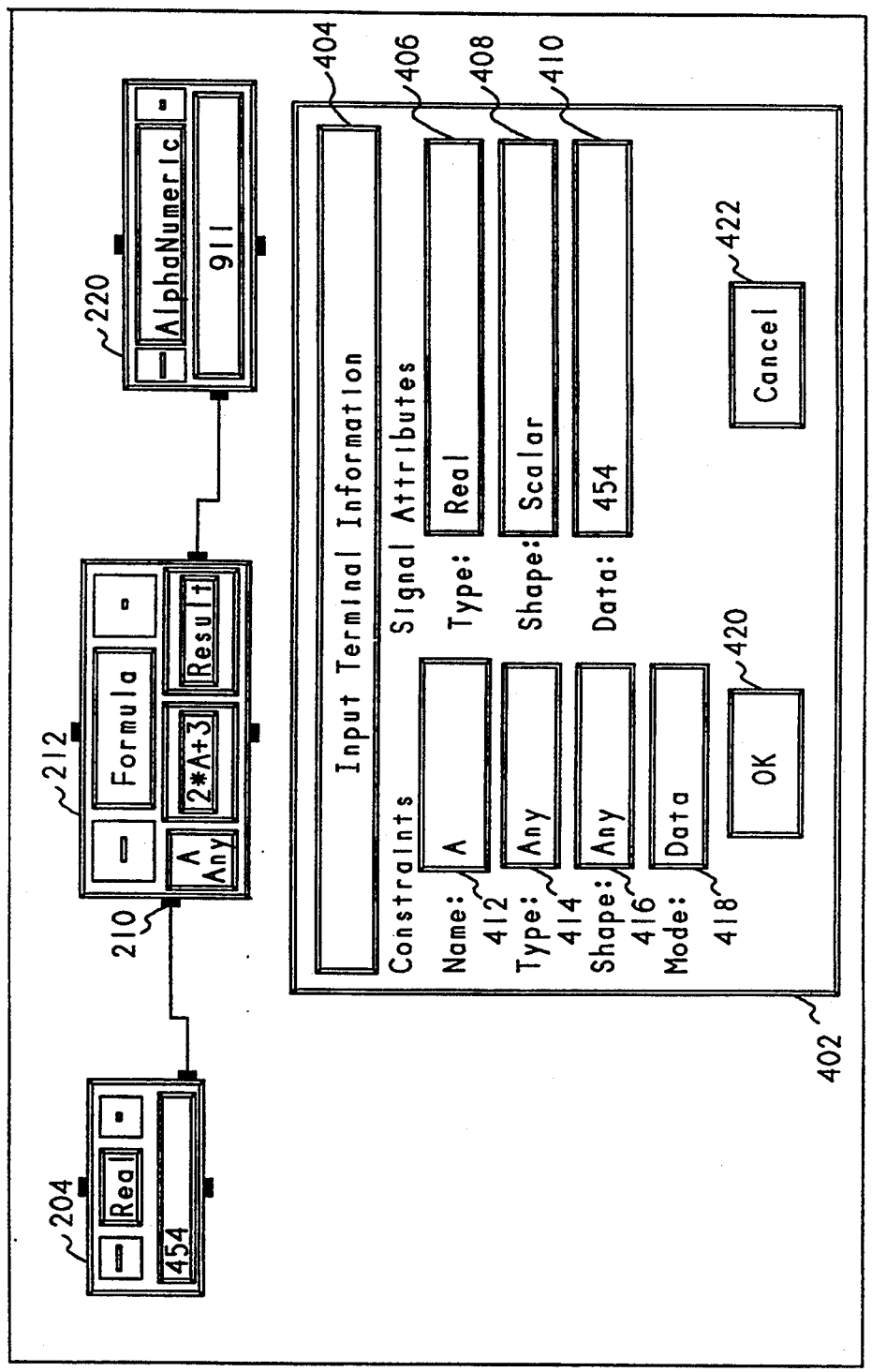
FIG. 4 shows a computer display illustrating the line probe display of an icon input terminal.

FIG. 4 shows the iconic network of FIG. 2 and further shows a dialog box with the line probe function being used to display information about an input terminal. Referring now to FIG. 4, the iconic network is shown including the real icon 204, the formula icon 212, and the alphanumeric icon 220. In FIG. 4 the user has requested that the line probe display information about the terminal 210 of the formula icon 212. The information about the input terminal 210 is shown in a dialog box 402. The title 404 indicates that the dialog box is displaying input terminal information. Within the dialog box 402 are three boxes that display signal attributes. Box 406 displays the data type being input to the icon 212 which, in this case, is a real number. Box 408 indicates that the shape of the data is scalar, and box 410 indicates that the value of the data is the real number "454".

Because the line probe has been used to display information about a terminal to an icon, the dialog box 404 displays an additional set of information called constraints. Within the constraints information, box 412 displays the name of the input terminal, in this case the single letter "A". As also illustrated in FIG. 2, the name of the terminal was used in the formula to 213. Box 414 illustrates that the type of data that this terminal will accept is any type. Box 416 shows that the shape of the data that this terminal will accept is any shape, and box 418 indicates that the mode for this terminal is a data mode, as opposed to a control mode terminal. Box 420 is used by the user of the system when they wish to terminate the display of the line probe information. The cancel box 422 allows the user to cancel any changes made to the input constraint fields or the data.

Figure 5:
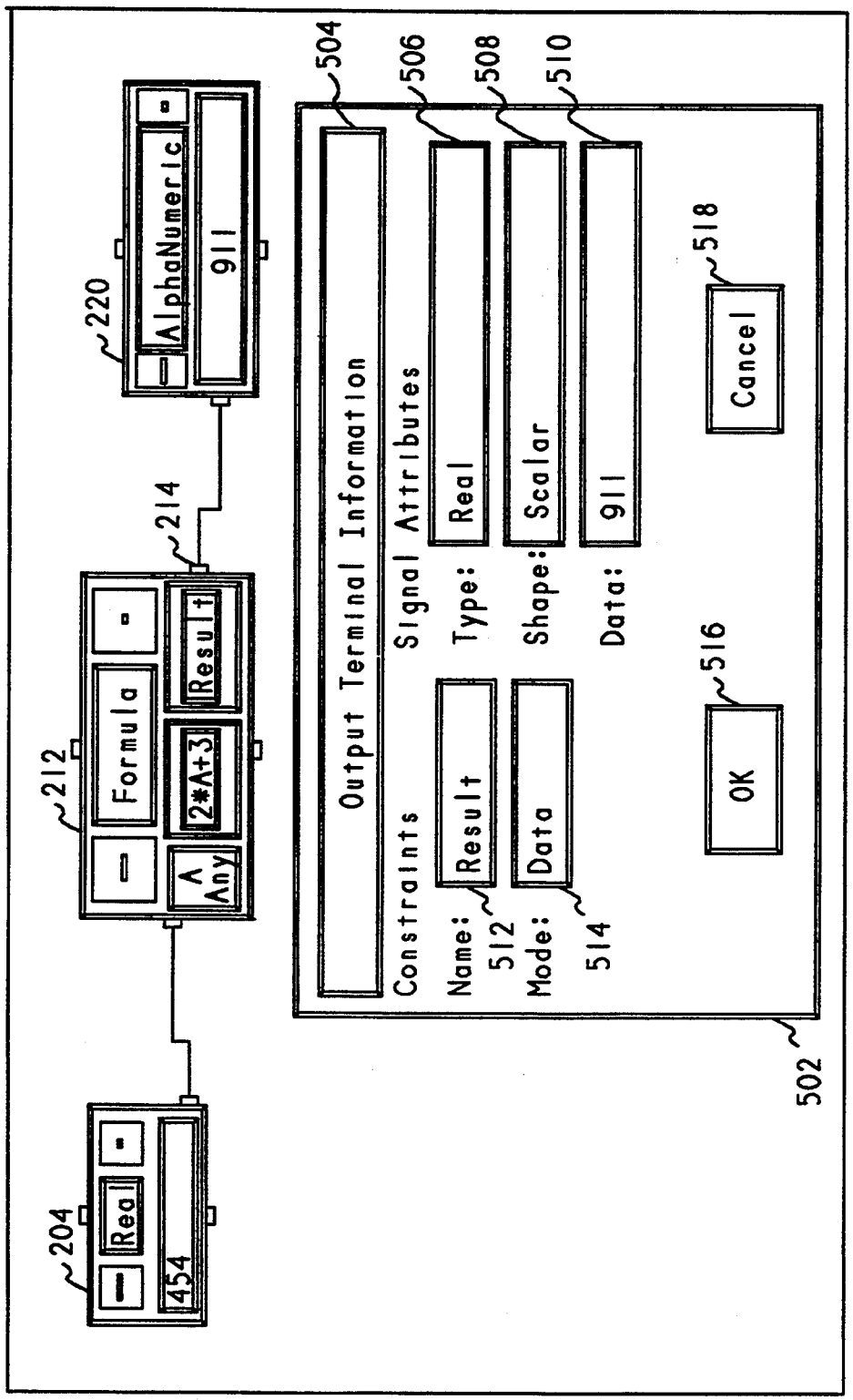
FIG. 5 shows a computer display illustrating the line probe display of an icon output terminal.

FIG. 5 shows the iconic network of FIG. 2 and further illustrates the use of the line probe to display information about an output terminal. Referring now to FIG. 5, the iconic network of FIG. 2 including the real icon 204, the formula icon 212, and the alphanumeric icon 220 is shown. Also shown is a dialog box 502 which is used by the line probe to display data about the output terminal 214 of the formula icon 212. The title 504 of the dialog box 502 illustrates that this is the line probe display of output terminal information. Part of the display includes signal attributes. Under the signal attributes, the type box 506 illustrates that the output data is a real number, and the shape box 508 illustrates that the output data is a scalar. The data box 510 shows that the value of the output data is 911. Because the line probe is displaying an output terminal, additional information entitled constraints is shown. Under constraints the name box 512 shows that the name of the output terminal is "Result", and box 514 shows that the mode of the output is data, as opposed to control. The "OK" box 516 is used by the user to discontinue the line probe display, and the cancel box 518 allows the user to cancel any changes made to the input constraint fields or the data.

Figure 6:
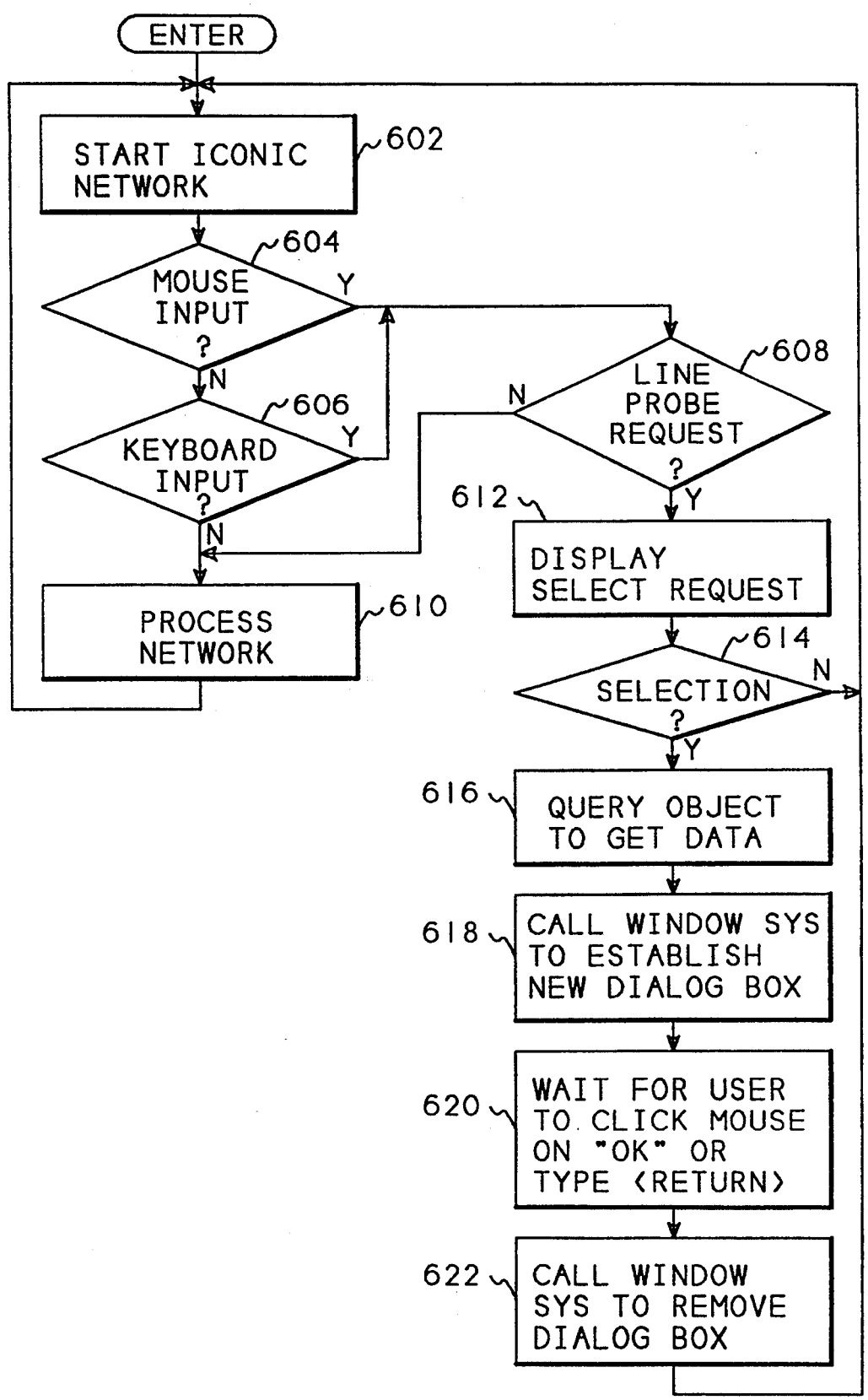
FIG. 6 shows a flowchart of the process of creating the line probe display.

FIG. 6 shows a flow chart of the system including processing of the line probe display. Referring now to FIG. 6, when the system is started block 602 starts the processing of the iconic network. Block 604 then determines whether mouse input has occurred and if not transfers control to block 606 which determines whether keyboard input has occurred. If either mouse or keyboard input has occurred, control transfers to block 608 which determines whether a line probe has been requested. A line probe is simply a menu item displayed on the screen along with the iconic network, and to request a line probe the user simply moves the mouse sprite to this menu item and clicks the mouse. If no input has occurred, or if the request is not for a line probe, control transfers to block 610 which processes part of the network and then returns block 602. Other aspects of the network processing are not shown in order to simplify the description of the invention. This loop continues until the user requests a line probe at which time control transfers to block 612.

Block 612 displays a request to the user asking them to select a line or terminal for the line probe to display. Block 614 then determines whether the user has selected a line or a terminal, and if not control simply returns to block 602 to continue the loop. If the user selects a line or terminal for display by the line probe, control transfers to block 616 which queries the object selected by the user to obtain information about the object. In an object oriented system, such as the iconic network of the present invention, icons, lines, terminals, and other items are defined as "objects", which have procedures and data within them. Therefore, an object can be "queried" by calling one of its procedures and asking that procedure to return data. Block 616 queries the object selected by the user, and asks it to return data describing the information to be displayed by the line probe. Block 618 then calls the windowing system to establish a new dialog box. In particular, during the establishment of the new dialog box, the windowing system will be instructed to call FIG. 7 to display information within the dialog box and to process input by the user into the dialog box. Several windowing systems exist that could be used by the present invention. For example, the X window system within the Unix operating system could be used. Unix is a registered trademark of AT&T. Microsoft Windows could also be used with the present invention. Microsoft and Windows are trademarks of Microsoft Corporation. The details of using specific windowing systems are well known to those skilled in the art.

After calling the windowing system to establish the dialog box, block 620 waits for the windowing system to return after the user has clicked the mouse on the "OK" button within the dialog box. After the user clicks the "OK" button, block 622 again calls the windowing system to remove the connection to FIG. 7. The dialog box will be erased by FIG. 7, as described below, but the windowing system needs to be called to remove the access to FIG. 7 after the user has completed observing the display. After calling the windowing system to remove the dialog box, block 622 returns to block 602 to wait for the user to input additional information.

Figure 7:
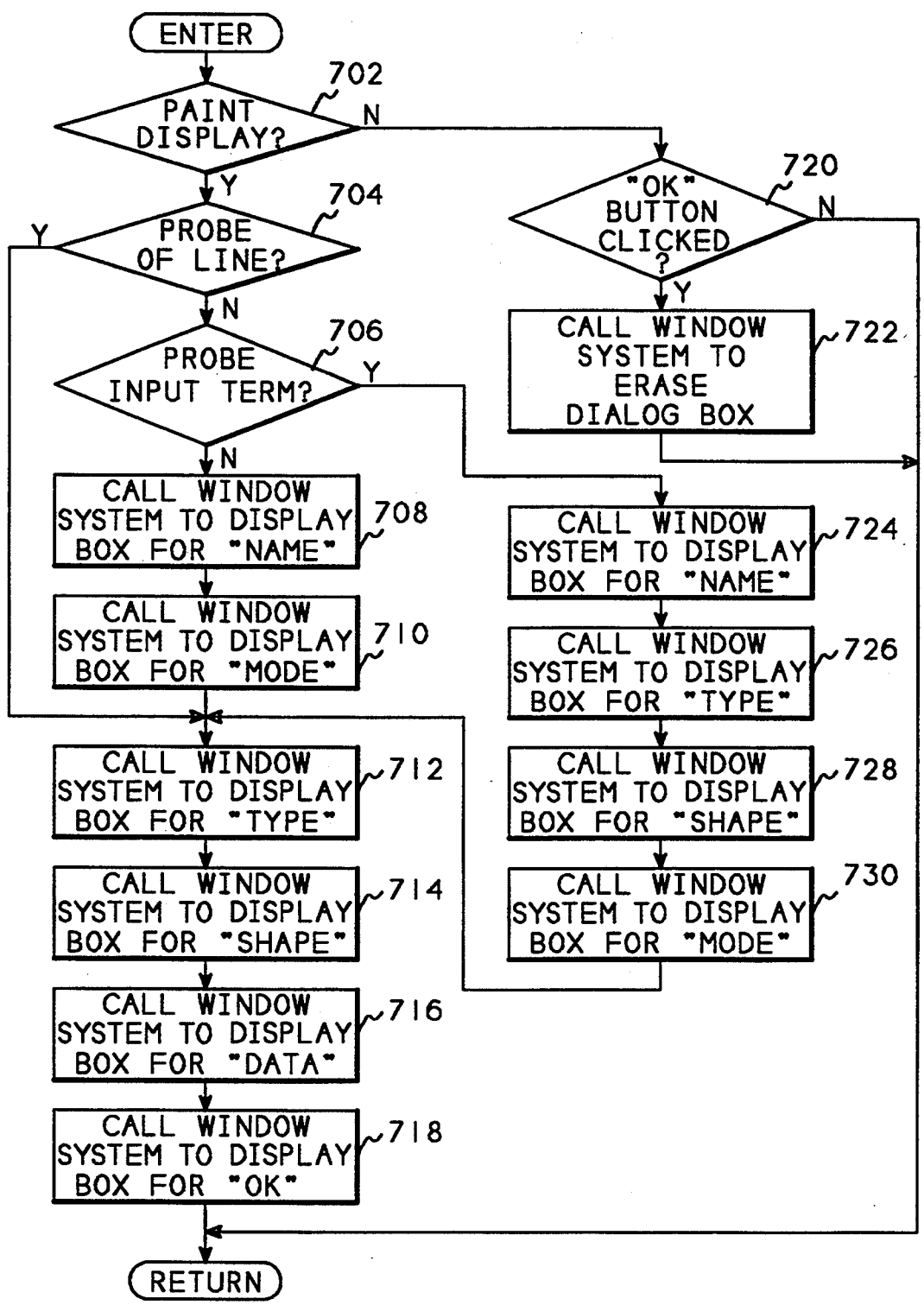
FIG. 7 shows a flowchart of the process of creating the dialog box of the line probe display.

FIG. 7 shows a flow chart of the process of creating and processing information within a dialog box. FIG. 7 will be called at least twice by the windowing system, after the box has been set up by FIG. 6. The first call to FIG. 7 will be to display the dialog box on the screen, and the second and possibly subsequent calls will be called whenever the user uses the mouse to click on one of the boxes within the dialog box, or attempts to input information to the dialog box. The windowing system may call FIG. 7 at any time to re-display the dialog box on the screen, if some other event within the windowing system has obscured the dialog box. Referring now to FIG. 7, after entry, block 702 determines whether this call is for display or re-display. If the call is for display, block 702 transfers to block 704 which determines whether the line probe has been requested to probe a line. If the line probe has been requested to probe a line, block 704 transfers to block 712, which will be described below. If the probe is not for a line, block 704 transfers to block 706 which determines whether the probe is for an input terminal. If the probe is for an input terminal, block 706 transfers to block 724 which calls the window system to display a box for the name of the terminal. This call will display the name information, such as box 412 of FIG. 4. After displaying the name, block 726 calls the windowing system to display a box for the type information, such as type box 414 of FIG. 4. Block 728 calls the windowing system to display a box and the shape information, such as the shape box 416 of FIG. 4. Block 730 calls the windowing system to display a box and the data for the mode, such as box 418 of FIG. 4. Block 730 then transfers to block 712, which will be described below.

If block 706 determines that the probe is not for an input terminal, it assumes the probe is for an output terminal and transfers to block 708. Block 708 calls the windowing system to display a box and data for the name, such as the name box 512 of FIG. 5. Block 710 calls the windowing system to display the box for the mode information, such as mode box 514 of FIG. 5. Control then transfers to block 712 to display the signal attributes information, which is the same for all three types of line probe displays. Block 712 calls the windowing system to display the type information, such as type box 304 of FIG. 3. Block 714 calls the windowing system to display a box and the data for the shape information, such as shape box 306 of FIG. 3. Block 716 calls the windowing system to display a box and the data for the line or terminal, such as data box 308 of FIG. 3. Block 718 calls the windowing system to display the "OK" box, such as "OK" box 310 of FIG. 3. This call also tells the windowing system to allow the user to click on this box and return control to FIG. 7 when the user performs the click.

If the call is not for display, block 702 transfers to block 720 which determines whether the user has clicked the mouse on the "OK" button. If the user has not clicked the mouse on the "OK" button, block 720 simply returns and ignores the user input. In the line probe, the only input allowed by the user is to terminate the probe by clicking on the "OK" box. If the user has clicked on the "OK" box, block 720 transfers to block 722 which calls the windowing system to erase the dialog box from the screen. FIG. 7 then returns to the windowing system, which will return to FIG. 6, block 622 if the user has clicked the "OK" box.

Although not shown in the Figures, the line probe may also allow a user to modify the information displayed. In this manner, the data output from an icon may be displayed and modified, therefore sending modified data to the next icon. This is particularly useful in debugging an iconic network.

A user may have a requirement to limit the values of data output or input by an icon. For example, an icon may expect a real number which a user wants to limit to between the values of 1 and 100. This might occur, for example, in an iconic program in which an operator of the system is allowed to enter the value of the temperature for an operation. The iconic programming system allows limits to be placed on data values. The line probe allows a user to display and change these limits.

A user may also have a requirement to map data values over a range. For example, the user may be taking readings, from a voltmeter, of the voltage coming from a source, and the user wants to see how the voltage readings change as the room temperature changes. Over the span of the readings, the room temperature may change, for example, from 40 degrees to 50 degrees, however, voltage and temperature readings are not taken together so there is no correspondence between the readings. The iconic programming system can map the voltage readings to the temperature readings by allowing the user to enter a formula or other means to cause the mapping. For example, the user could enter a method of linearly mapping the voltage to the temperatures such that the first voltage reading would be mapped to 40 degrees, and the last voltage reading would be mapped to 50 degrees. The readings in between the first and last would be mapped to successive temperatures approximately one-thirtieth of a degree apart, using a linear equation. In this manner, each voltage reading would be mapped to an element of a two by 300 matrix, with each element having a voltage and a temperature. The line probe allows the user to display and change the mappings of data.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In an iconic programming system process within a computer system, wherein said process performs functions defined within an iconic program containing two or more connected graphical objects, a computer implemented method for displaying information describing data contained within or data assigned to said two or more graphical objects of said process, said computer implemented method comprising the steps of:
   (a) accepting a display request to display data contained within or assigned to a graphical object;
      (a1) when said iconic programming system process is performing said iconic program at a time said display request is accepted, stopping said performing of said iconic program after accepting said display request;
   (b) programmatically obtaining data type information and data from the graphical object requested in step (a);
   (c) displaying said data type information and said data in a dialog box of said iconic programming system process;
   (d) accepting a terminate request to discontinue displaying said data type information and said data; and
   (e) removing said dialog box;
      (e1) continuing said performing of said iconic program after removing said dialog box.

2. The computer implemented method of claim 1 wherein step (a) further comprises the step of accepting a request to display data contained within a connecting line that connects at least two graphical objects.

3. The computer implemented method of claim 2 wherein step (c) further comprises the step of:
   (c1) displaying, within said dialog box, a shape of said data contained within said connecting line object.

4. The computer implemented method of claim 3 wherein step (c) further comprising the steps of:
   (c2) displaying data mappings applied to said data contained within said connecting line object; and
   (c3) displaying data limits for said data contained within said connecting line object.

5. The computer implemented method of claim 1 wherein step (a) further comprises the step of accepting a request to display data assigned to or data contained within an icon terminal object, wherein said icon terminal object is located at an end of a connecting line that connects at least two graphical objects.

6. The computer implemented method of claim 5 wherein step (c) further comprises the steps of:
   (c1) displaying a shape of said data contained within said icon output terminal object;

(c2) displaying a name of said icon output terminal object; and (c3) displaying a mode of said icon output terminal object, wherein said mode comprises a data mode or a control mode.

7. The computer implemented method of claim 6 wherein step (c) further comprises the steps of:

(c4) displaying data mappings applied to said data contained within said icon output terminal object; and (c5) displaying data limits for said data contained within said icon output terminal object.

8. The computer implemented method of claim 1 wherein step (c) further comprises the step of:

(c1) accepting input data from an input device attached to the iconic programming system process and (c2) using said input data to modify said data assigned to or contained within said graphical object, wherein said input data may insert or delete characters within said data assigned to or contained within said graphical object.

9. In an iconic programming system process within a computer system, wherein said process performs functions defined within an iconic program containing two or more connected graphical objects, a computer implemented method for displaying data contained within at least one connecting line that connects at least two graphical objects, or data assigned to an icon terminal object of said process, wherein said icon terminal object is located at an end of a connecting line that connects two or more graphical objects, or data contained within said icon terminal object of said process, said computer implemented method comprising the steps of:

(a) accepting a display request to display data contained within a connecting line or data assigned to data contained within an icon terminal object;

(a1) when said iconic programming system process is performing said iconic program at a time said display request is accepted, stopping said performing of said iconic program after accepting said display request;

(b) programmatically obtaining said data from the connecting line object or the icon terminal object requested in step (a); and (c) displaying said data in a dialog box of said iconic programming system process.

10. The computer implemented method of claim 9 further comprising the steps of:

(d) accepting a terminate request to discontinue displaying said data;

(e) removing said dialog box; and (f) continuing said performing of said iconic program.

11. The computer implemented method of claim 9 wherein step (c) further comprises the steps of (c1) displaying a data type of said data contained within said connecting line or said type of said data assigned to or contained within said icon terminal object;

(c2) displaying a shape of data contained within said connecting line or displaying a shape of data contained within or assigned to said icon terminal object.

12. The computer implemented method of claim 11 further comprising the steps of:

(c3) displaying data mappings of data contained within said connecting line or data assigned to or contained within said icon terminal object; and (c4) displaying data limits of data contained within said connecting line or data assigned to or contained within said icon terminal object.

* * * * *